US008782296B2

(12) United States Patent
Martinez

(10) Patent No.: US 8,782,296 B2
(45) Date of Patent: Jul. 15, 2014

(54) METHOD AND DEVICE FOR INCREMENTAL CONFIGURATION OF IMA TYPE MODULES

(75) Inventor: Philippe Martinez, Plaisance du Touch (FR)

(73) Assignee: AIRBUS Operations S.A.S., Toulouse (FR)

( * ) Notice: Subject to any disclaimer, the term of this patent is extended or adjusted under 35 U.S.C. 154(b) by 428 days.

(21) Appl. No.: 13/117,833

(22) Filed: May 27, 2011

(65) Prior Publication Data
US 2011/0296151 A1 Dec. 1, 2011

(30) Foreign Application Priority Data
May 27, 2010 (FR) ...................................... 10 54092

(51) Int. Cl.
G06F 13/10 (2006.01)
(52) U.S. Cl.
USPC .................................................... 710/8; 710/5
(58) Field of Classification Search
None
See application file for complete search history.

(56) References Cited

U.S. PATENT DOCUMENTS

| | | | | |
|---|---|---|---|---|
| 6,636,961 B1 * | 10/2003 | Braun et al. | ....................... | 713/1 |
| 7,451,196 B1 * | 11/2008 | de Vries et al. | ............... | 709/220 |
| 7,680,957 B1 * | 3/2010 | Ketterhagen et al. | ......... | 709/246 |
| 7,712,086 B2 * | 5/2010 | Hughes et al. | ................ | 717/131 |
| 7,984,323 B2 * | 7/2011 | Bass | ............................ | 714/4.11 |
| 8,024,433 B2 * | 9/2011 | Mason et al. | .................. | 709/221 |
| 8,140,475 B1 * | 3/2012 | Sparks | .......................... | 707/634 |
| 8,315,762 B2 * | 11/2012 | Correa et al. | ................... | 701/36 |
| 8,352,608 B1 * | 1/2013 | Keagy et al. | ................... | 709/226 |
| 2006/0179132 A1 * | 8/2006 | Babilon et al. | ................ | 709/222 |
| 2007/0180509 A1 * | 8/2007 | Swartz et al. | ...................... | 726/9 |
| 2009/0083734 A1 * | 3/2009 | Hotra | ............................... | 718/1 |
| 2011/0246753 A1 * | 10/2011 | Thomas | ........................... | 713/1 |
| 2011/0296379 A1 * | 12/2011 | McCready | .................... | 717/121 |
| 2013/0038525 A1 * | 2/2013 | Hakegard et al. | ............. | 345/156 |

OTHER PUBLICATIONS

French Preliminary Search Report issued Jan. 18, 2011, in French 1054092, filed May 27, 2010 (with English Translation of Categories of Cited Documents).
Paul Parkinson, et al., "Safety-Critical Software Development for Integrated Modular Avionics", Wind River White Paper, XP-002617228, 2006, 10 pages.
"The AIDA System: A $3^{rd}$ Generation IMA Platform", DIANA Project White Paper, XP-002617229, 2008, 19 pages.

(Continued)

Primary Examiner — Cheng-Yuan Tseng
(74) Attorney, Agent, or Firm — Oblon, Spivak, McClelland, Maier & Neustadt, L.L.P.

(57) ABSTRACT

The invention in particular has as an object the incremental configuration of an IMA-type module, the module comprising temporal and hardware resources as well as an operating system allowing a segregated running of at least two applications with the aid of at least one part of the resources. After having obtained (305) at least one first configuration parameter of at least one part of the resources, this parameter applying to a resource specific to the operating system or a resource common to the operating system and to at least one of the applications or to the applications, the module is configured (310) according to this parameter. A second configuration parameter of at least one part of the resources then is obtained (320), this second parameter applying to a resource specific to one of the applications. The module then is configured (330) according to the said at least one second parameter.

13 Claims, 4 Drawing Sheets

(56) References Cited

OTHER PUBLICATIONS

Alex Wilson, et al., "Incremental Certification and Integrated Modular Avionics", 27$^{th}$ Digital Avionics Systems Conference, IEEE/AIAA, XP-031372549, Oct. 2008, 8 pages.

Francisco Ferrero, et al., "Addressing System Reconfiguration and Incremental Integration within IMA Systems", DASIA 2009 Data Systems in Aerospace, XP-002617230, 2009, 8 pages.

\* cited by examiner

METHOD AND DEVICE FOR INCREMENTAL CONFIGURATION OF IMA TYPE MODULES

This invention relates to the configuration of data-processing systems in structures such as aircraft and more particularly to a method and a device for incremental configuration of computation and input/output modules making up an integrated modular avionic (IMA) platform, preserving the segregation of individual performances of applications implemented, in particular real-time applications. This method and this device enable in particular an incremental configuration of a module for each application loaded. The module here comprises a partitioned operating system. The input/output drivers (called drivers in English terminology) preferably have a programming interface based on the ARINC standard 653.

Modern aircraft more and more comprise electronic and data-processing systems to improve their performances and to assist the pilot as well as the crew members during their missions. Thus, for example, electrical flight controls make it possible to reduce the mechanical complexity of transmitting commands to the actuators and therefore the mass associated with these controls. Likewise, the presentation of pertinent information items enables the pilot to optimize the flight paths and to respond rapidly to any incident detected. Such information items are in particular speed, position, heading, meteorological and navigational data. The combination of these electronic and data-processing systems generally is called avionics.

For reasons of reliability, the avionics often has been distributed functionally by means of specific modules, also called LRU (abbreviation for Line Replaceable Unit in English terminology). According to this architecture, a point-to-point transmission mode is used between each module. In this way, for example, the flight controls are managed in a special device while the electrical supply is managed in another. A specific function thus is associated with each module.

Furthermore, each module supporting a critical function preferably is redundant so that the failure of one module does not bring about loss of the associated function. Operation of an aircraft using a redundant module when the main module is faulty may require a maintenance procedure.

In order to improve the functionalities of aircraft, reduce the weight of the electronic equipment items by virtue of a greater integration, reduce costs by virtue of use of generic modules, and facilitate maintenance procedures, the avionics now is more and more integrated according to an architecture called IMA (abbreviation for Integrated Modular Avionics in English terminology). According to this architecture, to the extent possible the functionalities of avionic systems use generic computation and input/output resources in which they are implemented. Nonetheless a segregation or partitioning system makes it possible to isolate each of the functionalities so that the failure of one function does not affect another.

FIG. 1a schematically illustrates an exemplary IMA architecture. The electrical box 100, also called electrical closet or cabinet in English terminology, here comprises bays 105-1 to 105-n adapted for accommodating boards, for example boards of PCB (abbreviation for Printed Circuit Board in English terminology) type. At its back, electrical cabinet 100 comprises connectors for connecting the boards inserted into bays 105-1 to 105-n to each other and for connecting these boards to the components of the aircraft. By way of illustration, electrical cabinet 100 here comprises two generic computation boards, also called computers, adapted for running software applications for implementing avionic functions.

Each computer here comprises the resources necessary thereto linked, in particular, to the electrical supply and to the communication functions. By way of illustration, patent application FR 2 903 511 describes such an architecture.

FIG. 1b illustrates the logic architecture associated with the IMA architecture illustrated on FIG. 1a. The computers here may receive and/or transmit data via a communication network 115. Each computation unit 110-i comprises an operating system 120-i allowing the running of one or more applications 125-i.

In this way, the IMA architecture provides a network layer, a hardware layer formed by the set of computation units, a low-level software layer and an applicative software layer supplying avionic functions.

Integrated modular avionics therefore provides computation and communications capabilities to the avionic applications requiring stable, guaranteed and reproducible performances, while ensuring an error containment and therefore a non-interference of the performance of one application with another. These capabilities are supplied within modules providing shared or pooled computation or communications resources.

The ARINC standard 653 defines a programming interface for avionic applications making it possible to access services of the operating system used. The latter makes it possible to run applications in shared time through a segregated allocation of temporal resources, in particular accesses to the central unit, and hardware resources, in particular accesses to the memory and to input/output peripherals, for example peripherals of AFDX (abbreviation for Avionic Full DupleX in English terminology), ARINC 429, CAN (acronym for Controller Area Network in English terminology), discrete and analogue type.

The configuration of a module typically is accomplished starting from a single binary file obtained through the compilation of configuration data specific to each application implemented in the module. Such a compilation therefore must be carried out for each development of the applications that entails a modification of the configuration of their programming interface in order to enable the corresponding configuration of the module. It therefore is necessary to have a multitude of configuration files for the module in order to compensate for the combinatorics of the developments specific to each application with a view to their integration. The necessity of producing configuration files covering this combinatorics limits the adaptability of concurrent developments of the applications and requires considerable work.

The invention makes it possible to resolve at least one of the problems set forth above.

The invention thus has as an object a method for configuration of a module in a modular data-processing system, the said module comprising temporal and hardware resources as well as an operating system enabling a segregated running of at least two applications with the aid of at least one part of the said resources, this method comprising the following steps, obtaining at least a first configuration parameter of at least one part of the said resources of the said module, the said at least one first configuration parameter applying to a resource specific to the said operating system or a resource common to the said operating system and to at least one of the said at least two applications or to the said at least two applications;

configuring the said module according to the said at least one first parameter;

obtaining at least one second configuration parameter of at least one part of the said resources of the said module, the said at least second configuration parameter applying to a resource specific to one of the said at least two applications; and, configuring the said module according to the said at least one second parameter.

The incremental configuration of a module according to the invention thus enables the installation of applications in a data-processing module without its being necessary to predefine the corresponding configuration.

The method advantageously further comprises a step of loading and running the said one of the said at least two applications.

The method makes it possible to install applications independently of each other.

According to a specific embodiment, the method further comprises a step of verifying the said at least one second parameter, the said verifying step comprising a step of comparing the said at least one second parameter with a least one datum for configuration of resources of the said module, the said at least one configuration datum defining the combination of resources of the said module that may be used by the said one of the said at least two applications.

In this way the method according to the invention allows the sharing of resources of the module preventing any problem of interference or of exceeding the capacity of the module during integration of applications. It also makes it possible to guarantee the maintenance of the demonstrated temporal performances for each application developed alone on the module when it is integrated with other applications and to guarantee a non-interference of individual performances of applications among themselves.

The said at least one first and at least one second parameters preferably are defined in separate configuration files thus being able to be easily prepared independently.

Still according to a specific embodiment, the method further comprises the following steps obtaining at least one third configuration parameter of at least one part of the said resources of the said module, the said at least one third configuration parameter applying to a resource shared between the said one of the said at least two applications and the said operating system or the other of the said at least two applications; and, configuring the said module according to the said at least one third parameter.

Such an incremental configuration of a module makes it possible to develop each application independently using shared resources of a module without its being necessary to predefine the corresponding configuration.

In addition, the method preferably comprises a step of verifying the conformity of the said at least one third parameter according to the said at least one first parameter, the said at least one first parameter applying to a resource common to the said operating system and to the said one of the said at least two applications. In this way, the sharing of resources of the module does not create any problem of interference or of exceeding the capacity of the module during the integration of applications while guaranteeing the temporal performances of the applications and a non-interference of the individual performances of the applications among themselves.

Still according to a specific embodiment, the said steps of obtaining at least one third configuration parameter and of configuring the said module according to the said at least one third parameter are repeated for the said other of the said at least two applications, the said at least one third configuration parameter associated with the said one of the said at least two applications and the said at least one third configuration parameter associated with the said other of the said at least two applications applying to a resource shared between the said one of the said at least two applications and the said other of the said at least two applications.

This incremental configuration of a module allows the concurrent development of applications having different development cycles and using shared resources without its being necessary to predefine the corresponding configuration.

The method preferably further comprises a step of verifying the conformity of the said at least one third parameter associated with the said one of the said at least two applications according to the said at least one third parameter associated with the said other of the said at least two applications. In this way the sharing of resources of the module does not create any problem of interference or of exceeding the capacity of the module during the integration of applications while guaranteeing the temporal performances of the applications and a non-interference of the individual performances of the applications among themselves.

According to a specific embodiment, the method further comprises a preliminary step of starting up the said module, the said starting-up step being accomplished according to a configuration defined by default, the said configuration defined by default allowing obtaining of the said parameters and configuring of the said module.

The invention also has as an object a computer program comprising instructions adapted for the implementation of each of the steps of the method described above when the said program is run on a computer, a device comprising means adapted for the implementation of each of the steps of the method described above as well as an aircraft comprising a module including this device.

The advantages provided by this computer program, this device and this aircraft are similar to those mentioned above.

Other advantages, purposes and characteristics of this invention become apparent from the detailed description that follows, presented by way of non-limitative example, with reference to the attached drawings in which:

FIG. 1, comprising FIGS. 1a and 1b, schematically shows an exemplary IMA architecture;

Figure 1A:
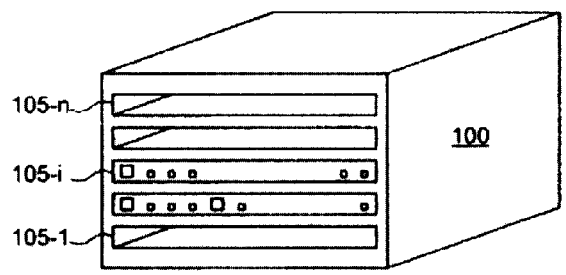
Figure 1B:
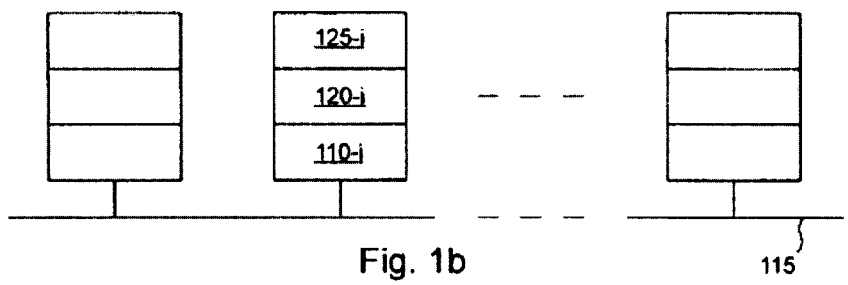

In general, the invention applies to a system making it possible to obtain a configuration of an avionic module through the installation of a file for configuration of the module independent of the life cycles of the applications implemented and the installation of each of the applications implemented by this module, comprising the installation of a configuration file associated with each of these applications. The applications and the corresponding configuration files may be installed on request, according to needs.

The configuration of a module here is based on the use of three types of configuration files.

a configuration file of the module, called MCT. It comprises the configuration parameters of the operating system that are not specific to a particular application. This file is given an installation of its own before the installations of the applications;

a configuration file of the resources, called RCS. It applies to the configuration parameters of the operating system that enable allocation of temporal resources, for example time brackets determined by cyclic schedulers, and hardware resources, for example memory slots and accesses to input/output perpherals (CAN bus, ARINC 429 bus, discrete lines, analogue lines, . . . ), of the module to a given application. This file is specified by a resources manager of the platform for a given operation. It is given to developers of applications able to be implemented in the module. In other words, this file specifies a perimeter of resources that may be used by an application for a development cycle, that is to say a budget for resources allocated to this application; and, a local configuration file of an application, called ACT. It specifies the actual use of the resources of the module by the application through services of the programming interface (API, acronym for Application Program Interface in English terminology) of the operating system and the drivers of the hardware resources. These services allow access only to the hardware resources inside the perimeter defined by the resource configuration file and the local configuration file. This local configuration file is specified by the application developer according to the associated resources configuration file.

In other words, the local configuration file of an application is derived from the resources configuration file associated with this application according to the resources actually used by the application. It therefore is a matter of a subassembly of the corresponding resources configuration file.

The configuration files use, for example, the XML (abbreviation for eXtended Markup Language in English terminology) or UML (abbreviation for Unified Modeling Language in English terminology) syntax. Each of these files comprises a reference to the resources concerned, for example a memory zone, as well as the associated parameters, for example a memory bracket of the memory zone concerned. An exemplary content of such a configuration file is the following:

clock, a memory and inputs/outputs), typically a module, an abstraction layer making it possible to dematerialize the target, the implementation of services, typically services of the ARINC 653 standard, a configuration interface of the platform and maintenance tools.

Each application here comprises a local configuration file (ACT) and an executable (EXE) type file corresponding to the application in itself.

The operating system prevents any application from accessing the hardware or temporal resources of another application which are specified in the resources configuration file (RCS) which is associated therewith. An application therefore cannot consume more resources than assigned in the resources configuration file that is associated therewith. For these purposes, a verification of the local configuration files with respect to the corresponding resources configuration files preferably is carried out prior to installation of the applications.

In order to facilitate the development and maintenance of the applications, a resources manager assigns to each application resources that it may use freely.

Thus, by way of illustration, a tool installed in a resources manager of the platform makes it possible to develop the configuration file for the module and the resources configuration files specific to each application, assigning the separate hardware and temporal resources to each application. Certain resources nonetheless may be shared, in read-only mode. Resources configuration files are used to configure tools for production of local configuration files.

Likewise, a tool installed in an applications developer and configured by a resources configuration file specific to an application makes it possible to develop a local configuration file to enable the use of all hardware or temporal resources of the module inside a resources envelope, defined in the corresponding resources configuration file, thus preventing any integration problem.

A software component of the module make it possible to construct, incrementally, at the startup of each operation, the complete configuration of the operating system and drivers for management of the hardware resources from the configuration file of the module and local configuration files of the applications loaded. It detects the resources common to sev-

```
<MEMORY>
    <MEMORY_CODE_AREA>
        <RESOURCE_REF_ID="CODE_P1"/>
        <ACT_CODE_AREA        ADDRESS-"0x00A00000" SIZE="0x00040000" />
        <PARTITION_CODE_AREA ADDRESS="0x008D0000" SIZE="0x00040000" />
    </MEMORY_CODE_AREA>
    <MEMORY_DATA_AREA>
        <RESOURCE_REF_ID="DATA_P1"/>
        <PARTITION_OS_DATA_AREA
            ADDRESS="0x00D90000"
            OS_AREA_SIZE ="0x00040000"
            LOCAL_AREA_SIZE="0x00040000"
            STACK_AREA_SIZE="0x0008000/>
        <PARTITION_CACHEABLE_DATA_AREA
            ADDRESS="0x00F74000"
            SIZE="0x0190000" />
    </MEMORY_DATA_AREA>
</MEMORY>
<TIME>
    <PARTITION_SCHEDULE RESOURCE_REF_ID="SCHEDULE_A2">
        <PERIODIC_RELEASE_POINT SLICE_REF_ID="11"/>
    </PARTITION_SCHEDULE/>
</TIME>
```

It is recalled that a platform is made up of a target comprising hardware resources (in particular a microprocessor, a eral applications and configures them only once (merging of common local configuration elements of the applications).

Figure 2:
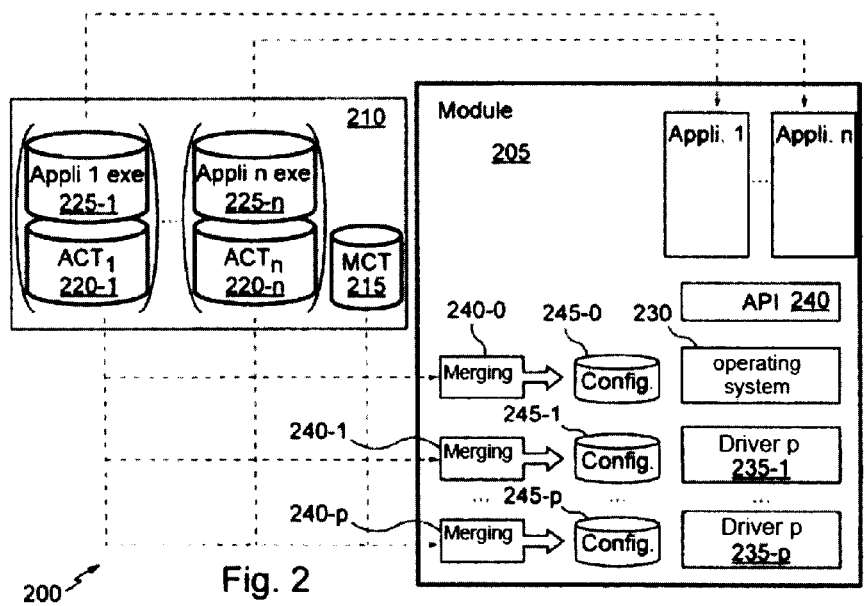
FIG. 2 illustrates the principle of incremental configuration of modules having an ARINC 653-type operating system according to the invention.

The diagram shown on FIG. 2 illustrates the principle of incremental configuration of modules having an ARINC 653-type operating system, in accordance with the invention.

After having been started up in a configuration mode by default, allowing in particular the loading of the module, the module is configured through the configuration file of the module (MCT). The configuration by default preferably is a minimal configuration allowing loading of the module, that is to say allowing reception of data and installation of applications.

As indicated above, a software mechanism for merging local configuration data specific to each application is loaded at startup of the module in order to construct the configuration specific to the operating system and to the driver at the time of loading of the applications.

Then the required applications are loaded. The module then is configured according to each installed application, from the local configuration file of the application (ACT). At the time of configuration of the module, here carried out when an application is loaded, a merging of the local configuration file with the configuration of the module is carried out so that the common resources are configured only once. The merging consists, for example, in determining whether the shared resources referred to by the local configuration file of the application in the process of loading have been configured in accordance with this configuration file. If they have not been configured, they are. If there is a difference between the configuration of these resources and the configuration referred to in the local configuration file of the application in the process of loading, the loading thereof is abandoned. An error then is indicated.

More precisely, environment 200 comprising module 205 to be configured and storage means 210 comprising in particular configuration file 215 of the module and local configuration files 220-1 to 220-$n$ associated with applications 1 to n being able to be loaded in module 205. Storage means 210 also comprise the executable code, marked 225-1 to 225-$n$, of these applications. It is seen here that storage means 210 may belong to module 205. It also is noted that the executable code of the applications as well as the configuration files may be received from a remote system.

Module 205 here is operated through an operating system 230 using drivers, referenced 235-1 to 235-$p$, as well as API 240.

In a first startup phase of module 205, a configuration file by default (not shown) is used to start the operating system and then to allow loading of configuration file 215 of the module and configuration of the module according to the configuration parameters defined in this file, in particular operating system 230 and drivers 235-1 to 235-$p$ used.

Local configuration files 220-1 to 220-$n$ then are used to determine the configuration of the module, incrementally, at the time of loading of each application. For these purposes, a merging of the configuration parameters of the application in the process of being loaded with the configuration parameters of the module, that is to say with the configuration file of the module and the local configuration files of the applications loaded beforehand, is carried out in order to avoid a multiple configuration of common resources and to verify configuration conformity with the local configuration file of the application in the process of being loaded.

As illustrated, merging here is carried out distributively, by type of parameters. In this way, for example, at the time of loading of application n, following loading of applications 1 to (n−1), a first merging of parameters of configuration file 215 of the module and parameters of local configuration files 220-1 to 220-$n$ is carried out in module 240-0 in order to obtain configuration 245-0 used to configure operating system 230. As indicated above, this merging makes it possible to verify the configuration conformity of the common resources used by application n and to configure the resources specific to this application. Similarly, other mergings of parameters of configuration file 215 of the module and parameters of local configuration files 220-1 to 220-$n$ are carried out in modules 240-1 to 240-$p$ in order to obtain configurations 245-1 to 245-$p$ used to configure drivers 235-1 to 235-$p$ used.

When they are implemented in module 205, applications 1 to n may interact with operating system 230 via API 240.

Figure 3:
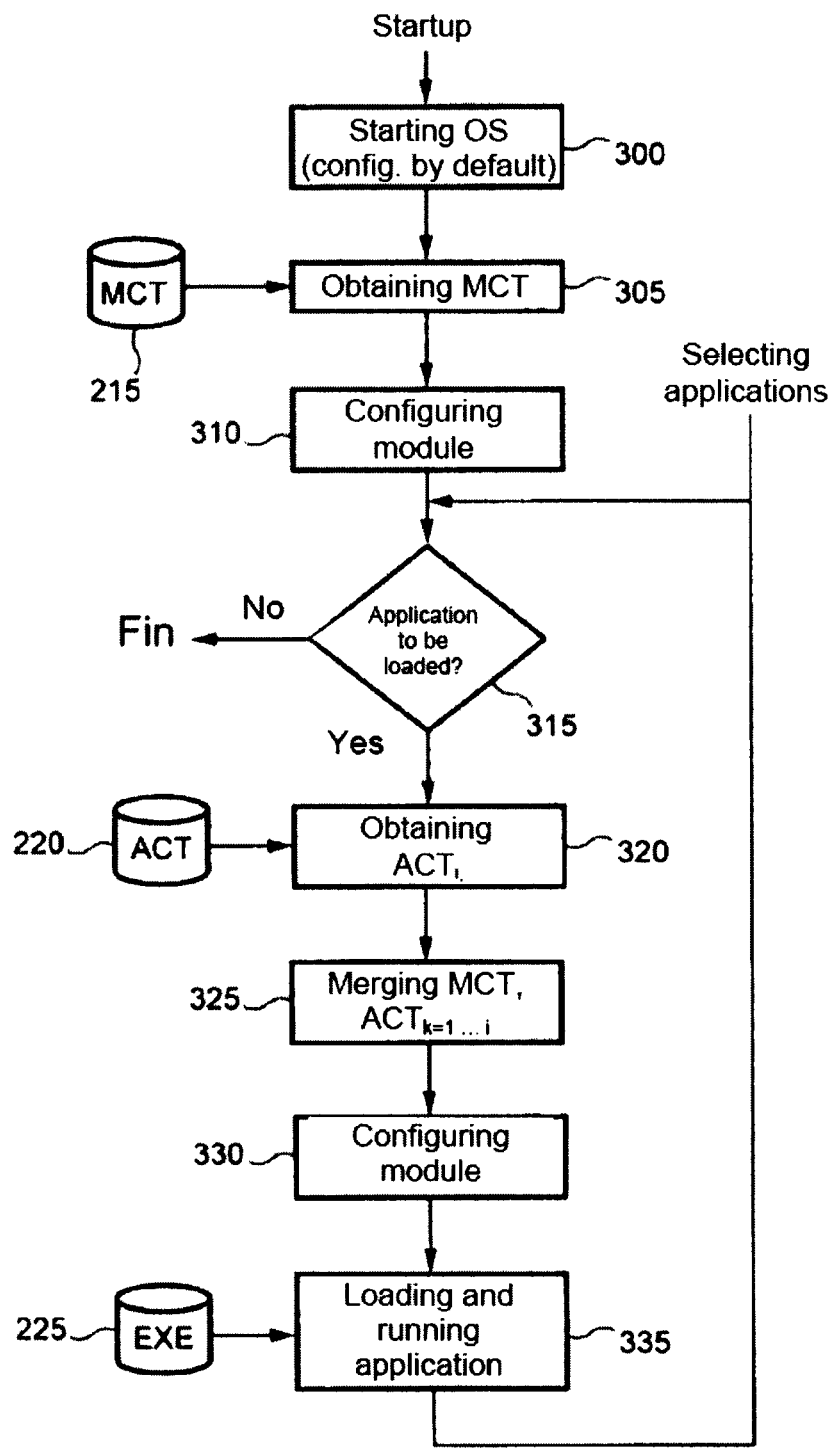
FIG. 3 illustrates an exemplary algorithm that may be implemented in the module illustrated on FIG. 2.

FIG. 3 illustrates an exemplary algorithm able to be implemented in module 205 illustrated on FIG. 2.

After startup of module 205, a first step (step 300) has as an object the start of the operating system, also called OS (abbreviation for Operating System in English terminology). The operating system here uses a configuration by default allowing subsequent loading of configuration files and applications. This configuration in particular may be stored in memory in the form of a stored file with those of the operating system, for example in a non-volatile memory of the module.

A following step has as an object the obtaining of the configuration file of the module (step 305) and the configuration of the module (step 310). As indicated above, this configuration file may be loaded from a memory of the module, external storage means or any other device, generically referenced 215.

During this step, a software component is loaded into memory of the module in order to construct, incrementally, at the startup of each application, the complete configuration of the operating system and the drivers for management of hardware resources from the configuration file of the module and the local configuration files of the loaded applications. This software component is in particular in charge of implementing steps 315 to 330 described below.

Following the configuration of the module, a test is performed to determine whether an application is to be loaded (step 315). The selection of one or more applications to be loaded may be made by a user, determined in an applications configuration file accessible to the module or determined automatically according to predetermined logic rules. If no application is to be loaded, the algorithm comes to an end.

On the contrary, if at least one application is to be loaded, it is identified and the corresponding local configuration file ($ACT_i$) is obtained (step 320). Index i here is incremented after each (successful) installation of the application. It therefore represents the number of applications loaded or in the process of being loading. Again, this local configuration file may be loaded from a memory of the module, from external storage means or from any other device, generically referenced 220.

A step of merging (step 325) then is implemented to merge the configuration parameters of the application in the process of being loaded with the configuration parameters of the module and the configuration parameters of the applications previously loaded.

According to a specific embodiment, this step in particular has as an object to verify that the common resources configuration defined in the local configuration file of the application in the process of being loaded is in conformity with the corresponding resources configurations file. For these purposes, the parameters of the local configuration file are compared with those defined in the corresponding resources configuration file.

If the hardware or temporal resources linked to the application in the process of being loaded are in a resources envelope defined in the corresponding resources configuration file, another test is performed to verify the conformity of the common resources configuration. Otherwise, loading of the application is ended.

In order to verify the conformity of the common resources configuration, the common resources configuration parameters, generally defined by typing, referred to in the local configuration file of the application in the process of being loaded are compared with the configuration of the module, that is to say, for example, with the configuration file of the module and the local configuration files of the applications previously loaded. If the configuration parameters of common resources referred to in the local configuration file of the application in the process of being loaded are not in conformity with the configuration of the module, loading of the application is ended.

If, on the contrary, the configuration parameters of common resources referred to in the local configuration file of the application in the process of being loaded are in conformity with the configuration of the module, the configuration of the module is updated according to the local configuration parameters specific to the application in the process of being loaded and the module is configured accordingly (step 330).

The application then is loaded and run (step 335). The executable code of the application may be loaded from a memory of the module, from external storage means or from any other device, generically referenced 225. Alternatively, the executable code of the application may be loaded at the same time as the local configuration file (step 320).

In this way, when a new application or a new version of an application previously installed on the module is installed in the module, the configuration is automatically adapted accordingly.

Figure 4:
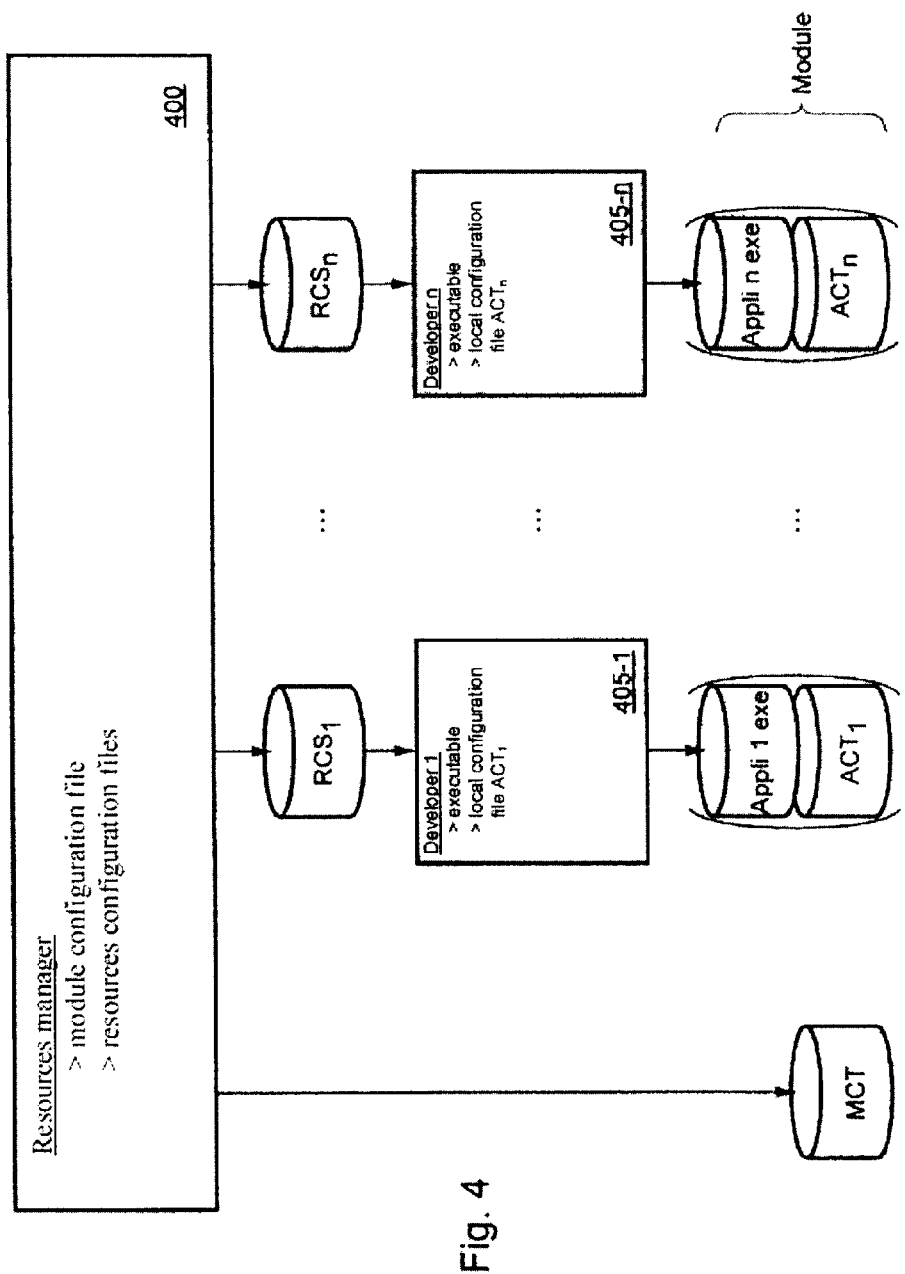
FIG. 4 illustrates certain processes and tools that may be used to produce configuration files; and, FIG. 5 illustrates an exemplary hardware architecture adapted for implementing the invention or a part of the invention.

The diagram shown on FIG. 4 illustrates certain processes and tools able to be used for producing configuration files such as those described above.

A tool 400 for management of resources here makes it possible to allocate resources of a module to applications and to verify the coherence of these parameters with regard to the segregation necessary for proving the non-interference of performances of the applications among themselves. Tool 400 is, for example, a software environment implemented on a computer of PC (abbreviation for Personal Computer in English terminology) type or a server, allowing an operator to determine or control the allocation of resources to each application. Tool 400 in particular has as an object to determine the configuration file MCT of the module that comprises the configuration parameters of the operating system that are not specific to a particular application as well as resource configuration files $RCS_1$ to $RCS_n$ that indicate the temporal and hardware resources of the module allocated to each application 1 to n able to be implemented in the module.

Resource configuration files $RCS_1$ to $RCS_n$, specific to each application, are transmitted to the developers of each of these applications. The developers here use tools referenced 405-1 to 405-n to develop the code for these applications and to generate the corresponding executable code as well as to determine the resources actually used by these applications, within the limit of the resources defined in the corresponding resources configuration files. In other words, resources configuration files are used to configure tools for specification of local configurations. These tools ensure the confinement of the local configurations within the perimeter defined by the resources manager of the module and, consequently, the qualification standing (demonstrated performances) of each application when these applications are run together in shared time on the module.

As illustrated, the configuration file of the module (MCT) as well as the local configuration files ($ACT_1$ to $ACT_n$) and the executable code associated with applications 1 to n are transmitted to the module or to associated storage means to allow implementation thereof.

Figure 5:
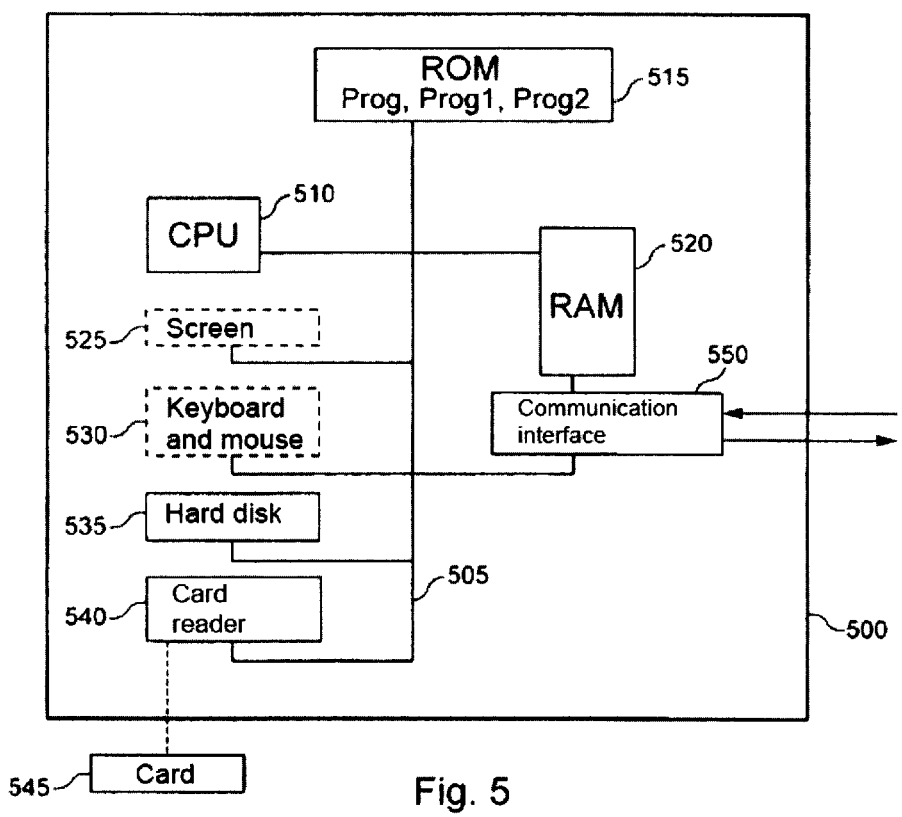

FIG. 5 illustrates an exemplary hardware architecture, for example a computer, a server or a data-processing machine, adapted for implementing the invention, in particular the algorithm shown on FIG. 3, as well as the tools for management of resources and development described with reference to FIG. 5. Device 500 here comprises a communication bus 505 to which there are connected:

one or more central processing units or microprocessors 510 (CPU, abbreviation for Central Processing Unit in English terminology);

a read-only memory 515 (ROM, acronym for Read Only Memory in English terminology) that can comprise the programs (prog, prog1 and prog2) necessary for implementation of the invention;

a random access or cache memory 520 (RAM, acronym for Random Access Memory in English terminology) comprising registers adapted for recording variables and parameters created and modified in the course of running the aforesaid programs; and a communication interface 550 adapted for transmitting and receiving data.

Device 500 optionally also may have the following components:

one or more display units 525 making it possible to display data and able to serve as a graphical interface with the user who will be able to interact with the programs according to the invention, with the aid of a keyboard and a mouse 530 or another pointing device such as a touch screen or a remote control;

a hard disk 535 that can comprise the aforesaid programs, information items to be processed according to the invention, a configuration reference system, a theoretical and/or actual configuration ratio and/or rules for computing verification codes; and a memory card reader 540 adapted for receiving a memory card 545 and reading and writing therein data processed or to be processed according to the invention.

The communication bus permits communication and interoperability among the various components included in device 500 or connected thereto. The depiction of the bus is not limitative and, in particular, the central unit is able to communicate instructions to any device 500 directly or via another component of device 500.

The executable code of each program permitting the programmable device to implement the processes according to the invention may be stored, for example, on hard disk 535 or in read-only memory 515.

According to a variant, memory card 545 may contain information items, in particular information items to be processed according to the invention, as well as the executable code of the aforesaid programs which, once read by device 500, is stored on hard disk 535.

According to another variant, the executable code of the programs and the information items to be processed according to the invention will be able to received, at least partially, via interface 550, to be stored in a manner identical to that described above.

More generally, the program or programs as well as the information items to be processed according to the invention will be able to be loaded into one of the storage means of device 500 before being run.

Central unit 510 is going to control and direct the running of the instructions or portions of software code of the program or programs according to the invention, which instructions are stored on hard disk 535 or in read-only memory 515 or else in the other aforesaid storage components. During boot-up, the program or programs that are stored in a non-volatile memory, for example hard disk 535 or read-only memory 515, are transferred to random access memory 520 which then contains the executable code of the program or programs according to the invention, as well as registers for storing the variables and parameters necessary for implementation of the invention.

Naturally, to satisfy specific needs, an individual competent in the field of the invention will be able to apply modifications in the foregoing description.

The invention claimed is:

1. A method for configuration of a module in a modular data-processing system, the module including temporal and hardware resources as well as an operating system allowing segregated running of at least two applications with the aid of at least one part of said resources, the method comprising:
   obtaining at least one first configuration parameter of said at least one part of said resources of the module, the at least one first configuration parameter applying to one of a resource specific to the operating system or a resource common to the operating system and to at least one of the at least two applications or to the at least two applications;
   configuring the module according to the at least one first configuration parameter;
   obtaining at least one second configuration parameter of at least one part of said resources of the module, the at least second configuration parameter applying to a resource specific to one of the at least two applications;
   merging the at least one first configuration parameter with the at least one second configuration parameter; and
   incrementally configuring the module according to said merging the at least one second configuration parameter with the at least one first configuration parameter,
   wherein the at least one first and at least one second configuration parameters are defined in separate configuration files,
   wherein said merging includes verifying the at least one second configuration parameter, said verifying including comparing the at least one second configuration parameter with at least one resources configuration datum of the module, the at least one resources configuration datum of the module defining a combination of resources of the module able to be used by said one of the at least two applications, and
   wherein the configuration file associated with the at least one first configuration parameter is a configuration file of the module, and the configuration file associated with the at least one second configuration parameter is a local configuration file of said one of the at least two applications.

2. The method according to claim 1, further comprising loading and running said one of the at least two applications.

3. The method according to claim 1, further comprising:
   obtaining at least one third configuration parameter of said at least one part of said resources of the module, the at least one third configuration parameter applying to a resource shared between said one of the at least two applications and the operating system or the other of the at least two applications; and
   configuring the module according to the at least one third configuration parameter.

4. The method according to claim 3, further comprising verifying conformity of the at least one third configuration parameter according to the at least one first configuration parameter, the at least one first configuration parameter applying to the resource common to the operating system and to said one of the at least two applications.

5. The method according to claim 3 or claim 4, wherein said obtaining at least one third configuration parameter and configuring the module according to the at least one third configuration parameter are repeated for the other of the at least two applications, the at least one third configuration parameter associated with said one of the at least two applications and the at least one third configuration parameter associated with the other of the at least two applications applying to a resource shared between said one of the at least two applications and the other of the at least two applications.

6. The method according to claim 5, further comprising verifying conformity of the at least one third configuration parameter associated with said one of the at least two applications according to the at least one third configuration parameter associated with the other of the at least two applications.

7. The method according to claim 1, further comprising starting up the module, before said obtaining the at least one first configuration parameter, said starting-up being performed according to a configuration defined by default, the configuration defined by default allowing said obtaining of the at least one first configuration and the configuration of the module.

8. A non-transitory computer-readable storage medium storing computer-readable instructions that, when executed by a computer, cause the computer to perform a method for configuration of a module in a modular data-processing system, the module including temporal and hardware resources as well as an operating system allowing segregated running of at least two applications with the aid of at least one part of said resources, the method comprising:
   obtaining at least one first configuration parameter of said at least one part of said resources of the module, the at least one first configuration parameter applying to one of a resource specific to the operating system or a resource common to the operating system and to at least one of the at least two applications or to the at least two applications;
   configuring the module according to the at least one first configuration parameter;
   obtaining at least one second configuration parameter of at least one part of said resources of the module, the at least second configuration parameter applying to a resource specific to one of the at least two applications;
   merging the at least one first configuration parameter with the at least one second configuration parameter; and
   incrementally configuring the module according to said merging the at least one second configuration parameter with the at least one first configuration parameter,
   wherein the at least one first and at least one second configuration parameters are defined in separate configuration files,
   wherein the merging includes verifying the at least one second configuration parameter, the verifying including comparing the at least one second configuration parameter with at least one resources configuration datum of the module, the at least one resources configuration datum defining a combination of resources of the module able to be used by said one of the at least two applications, and wherein the configuration file associated with the at least one first configuration parameter is a configuration file of the module, and the configuration file associated with the at least one second configuration parameter is a local configuration file of said one of the at least two applications.

9. A device for configuration of a module in a modular data-processing system, the module including temporal and hardware resources as well as an operating system allowing segregated running of at least two applications with the aid of at least one part of said resources, comprising:

hardware processing circuitry configured to obtain at least one first configuration parameter of said at least one part of said resources of the module, the at least one first configuration parameter applying to one of a resource specific to the operating system or a resource common to the operating system and to at least one of the at least two applications or to the at least two applications;

configure the module according to the at least one first configuration parameter;

obtain at least one second configuration parameter of at least one part of said resources of the module, the at least second configuration parameter applying to a resource specific to one of the at least two applications;

merge the at least one first configuration parameter with the at least one second configuration parameter; and incrementally configure the module according to said merging the at least one second configuration parameter with the at least one first configuration parameter, wherein the at least one first and at least one second configuration parameters are defined in separate configuration files, wherein the merging includes verifying the at least one second configuration parameter, the verifying including comparing the at least one second configuration parameter with at least one resources configuration datum of the module, the at least one resources configuration datum defining a combination of resources of the module able to be used by said one of the at least two applications, and wherein the configuration file associated with the at least one first configuration parameter is a configuration file of the module, and the configuration file associated with the at least one second configuration parameter is a local configuration file of said one of the at least two applications.

10. The device according to claim 9, wherein the device is configured to be implemented on an aircraft comprising the module.

11. The method according to claim 1, wherein said merging the at least one first configuration parameter with the at least one second configuration parameter results in avoidance of multiple configurations for common resources.

12. The non-transitory computer-readable storage medium according to claim 8, wherein the merging of the at least one first configuration parameter with the at least one second configuration parameter results in avoidance of multiple configurations for common resources.

13. The device according to claim 9, wherein the merging of the at least one first configuration parameter with the at least one second configuration parameter results in avoidance of multiple configurations for common resources.

* * * * *